Patented Dec. 2, 1952

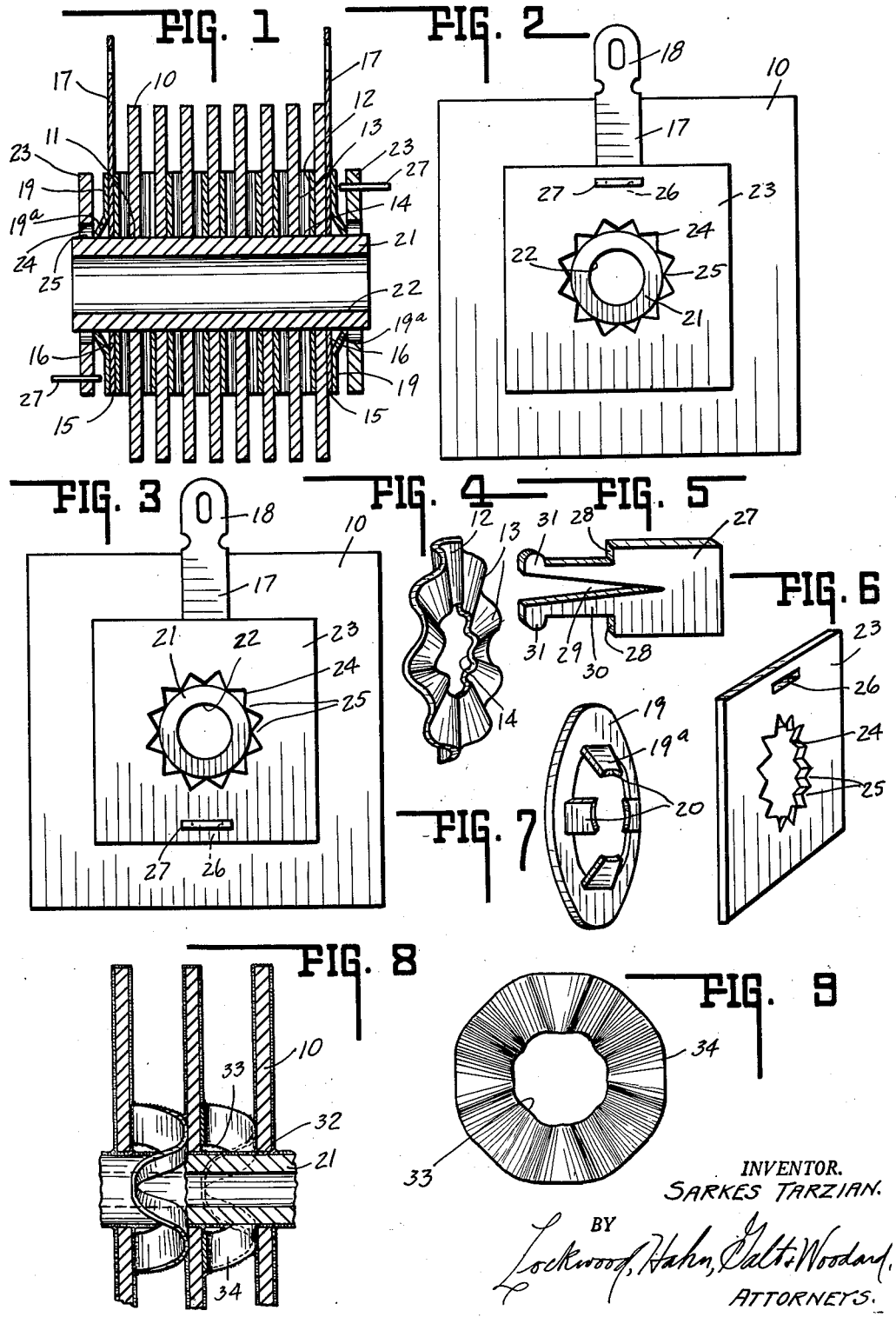

2,620,384

UNITED STATES PATENT OFFICE 2,620,384

SELENIUM AND LIKE RECTIFIER STACK

Sarkes Tarzian, Bloomington, Ind.

Application February 15, 1951, Serial No. 211,081

13 Claims. (Cl. 175—366)

This invention relates to electrical rectifiers and more particularly to those of the selenium type, but said invention is not necessarily restricted thereto. For purposes of illustration, however, a selenium rectifier with the invention included therein is illustrated and described hereinafter by way of example only.

One chief object of the present invention is to air cool a rectifier stack and thus insure certainty of stack operation and without cell burnout.

Another chief object of the present invention is to selectively provide, as desired or required, a stop or stops to prevent stack rotation, especially in small units.

A further chief object of the invention is to standardize parts, etc., whereby rectifiers of this general type can be fabricated and assembled with a minimum of labor and chance for error.

One chief feature of the present invention resides in the resilient spacing washer whereby better, greater and more distributed contact is obtained between this washer and the cell and the central portion thereof is ventilated.

Another chief feature of the present invention resides in the use of a plurality of such washers with one or more cells, there usually being as many such washers or one more than there are cells employed in a stack.

A further chief feature of the present invention resides in the provision of stop means, when desired, at either or both ends of the stack to prevent rotation thereof relative to the stack, said stop means being of quick attachable type so that the specific requirements of different purchasers can be rapidly and readily met from a stock-pile of stacks initially devoid of such stops.

A further object of my invention is to provide for the thorough sealing of the rectifier plates, and particularly at their inner edges where they are mounted on the insulating tube, and where the spacing washers engage the plates, against attack from moisture, corrosive fumes and the like.

Other objects and features of the invention will be set forth more fully hereinafter.

The present application is a continuation in part, for so much as is disclosed therein, of my co-pending application Serial 133,514, filed December 17, 1949, now abandoned.

The full nature of the invention will be understood from the accompanying drawings and the following description and claims:

In the drawings,

Fig. 1 is an enlarged longitudinal sectional view through a stack embodying the invention.

Fig. 2 is one end view thereof.

Fig. 3 is an opposite end view.

Fig. 4 is a perspective view of the resilient washer.

Fig. 5 is a perspective view, to a greatly larger scale, of a stop member.

Fig. 6 is a perspective view of an insulator plate.

Fig. 7 is a perspective view of a lock washer.

Fig. 8 is a detailed section, enlarged to show the sealing of the parts against moisture etc.

Fig. 9 is an elevation of a modified form of spacing washer.

In the rectifier art, as is well known, each cell has a certain current and voltage capacity. The summation, within limits, of cells into a stack provides a unit having the aforesaid current capacity and in general the voltage capacity multiplied by the number of cells utilized in the stack.

For current capacity greater than the aforesaid either larger cells may be employed or a plurality of stacks may be connected in parallel. Units can be built up to accommodate single or multiphase alternating current supplies as is well known in the rectifier art.

Also connections may be supplied to provide from one rectifier structure, direct current voltages of different amounts as also well understood in the rectifier art. Having briefly outlined the fields of use reference is now had to the cell itself which also is well known in the rectifier art. Such cell usually comprises a base plate of iron or aluminum that has its junction face etched, sanded or the like. Upon this face is dusted or otherwise deposited selenium powder in the amorphous form. The dusted plate is then subjected to a pressure of about 1700 pounds per square inch and at a temperature of about 130° C. This forms a mechanical union between the plate and the selenium now in crystalline form. The selenium exposed face is provided with a barrier layer such as a suitable lacquer or oxide material and this in turn is covered with material such as Wood's metal which forms the front electrode of the cell. This metal comprises low melting point alloy and its thickness is about 0.003 of an inch. This briefly is a generalized description of a selenium cell and its construction, which as stated previously, is conventional to the art.

Heretofore solid washers have been included between cells for spacing purposes and to form a stack. These usually are of small diameter relative to the plate size and when the stack is compressed and locked together, such a washer may electrically cut out the center of the cell which leaves the remainder of the plate inactive, consequently decreasing the capacity of the stack. As a result, such a structure frequently burns up because one or more cells have been cut out.

The present invention accordingly seeks to minimize the aforesaid difficulties. Since stack conventional connections and cell conventional construction has been sufficiently described, reference will now be had to the basic invention herein illustrated. By way of example only it is shown as a two terminal unit, although a greater number may be incorporated and employed whenever desired or required.

In Fig. 1, 10 indicates a rectifying plate having a central hole 11 therethrough. This plate may have any suitable outline, area dimensions and thickness dimension as desired or required. Herein the plate is shown square in outline.

Between adjacent cells are disposed the spacing washers, the most important single feature of the present invention. As stated, the spacing washer heretofore employed has been solid and of small diameter. It is not compressible.

The present washer 12 is also circular in side elevation as it were, see Fig. 4, but its area is far greater than the solid washer usually employed. Also, it is corrugated as at 13, see Fig. 1, and these corrugations are of radial character. It also is centrally apertured at 14. Herein a spring metal stamping suffices.

Each washer 12, accordingly, at the outer faces is arranged to have radial contact with the cells between which it is disposed. These contacts, obviously are alternated and annularly arranged. The area in actual contact with each plate, it has been ascertained, exceeds that of the conventional spacing washer. While the washer has been disclosed as a radially corrugated annular ring-like member, it may be otherwise formed and utilized so long as it permits air access between the plates and substantially to the central apertures thereof and in the washer.

In Fig. 1 the stack is shown provided with but two terminals. More may be utilized if desired. Each comprises a circular portion 15 centrally apertured at 16 and having extending radially therefrom a lead member 17 terminating in an extended end 18 arranged for wire and like connection which connection usually is of solder type.

Bearing against a plate, at each end, or as shown in Fig. 1 against two outermost terminal members are the lock washers 19, see Fig. 7, having the inwardly and angularly disposed anchoring tongues 19a terminating in arcuate edges 20.

An insulation tube 21 of the desired and required length with the central bore 22 therethrough is provided. When thereon the plates, terminals, spacing washers, etc. are all assembled in coaxial alignment and with the lock washers at the opposite ends and with tongues directed outwardly as shown, the resulting stack is subjected to compression or clamping action. This causes all washers to effect desired plate contact and all parts then are held, when the compressive force is released, under stress because the lock washer tongues have now seated or dug into the Bakelite or like tube 21.

To protect the stack ends of the insulation tube 21 from mechanical drainage while the stack is being bolted to a chassis or support, there is friction mounted upon each end of said tube 21 an insulation or fibre end washer 23 having a central aperture 24 therein to frictionally take said tube. These apertures may be toothed, see Fig. 6, as at 25. Also at one side is an elongated slot 26.

These washers may be of two contrasting colors or each washer may be contrastingly colored on opposite sides. However, colored, these two washers provide a slot forwardly of the tube at one end of the stack and rearwardly of said tube at the opposite end of the stack.

A stop member 27, see Fig. 5, includes a body portion shouldered at 28 and adjacent thereto a cutout as at 29 to form resilient tongues 30 which terminate in oppositely directed lateral enlargements 31.

When such a member is presented to the slot 26 in the insulation washer and from either side, enlargements 31 are forced towards each until they pass through the slot whereupon they again spring apart. At this point shoulders 28 abut the receiving face of said insulation washer and the stop member is rigidly anchored to that washer so that the stop body portion projects outwardly from the washer and is available for engagement with a chassis supported stop or stops to limit rotary movement of the stack when it is bolted upon the chassis by a bolt disposed in tube bore 22. Such stop accordingly insures proper positioning of the terminals for stack connection into the electrical system.

As initially stated, one customer may demand a right hand stop, another a left hand, another both stops and another no stops. The present invention accordingly permits stacks to be assembled without stops and carried in stock as such. Upon order the stop or stops are applied as specified. Color designation facilitates stop application to the washer by unskilled labor without extreme attention and also facilitates final inspection should the unit inspected be substantially symmetrical and broadly reversible. Such color designation also facilitates unit assembly for similar reasons.

As rectifiers of the type disclosed are frequently used where they may be exposed to the weather, or to corrosive fumes, and as the most vulnerable point of attack for moisture and the like is at the edges of the openings or central holes 11 in the plates 10 and at the point of contact between the washers 12 and the plates as well as at the edges of the washers, I provide means for effectually sealing the rectifier against moisture attack. To this end, the openings 11 in the plates 10 are made sufficiently large to leave a space 32 between the walls of the opening and the outer periphery of the tube 21, as shown in Fig. 8. Furthermore, the center opening 33 in the washers, particularly in such washer as the washer 34, are considerably enlarged.

After the parts have been completely assembled, with the exception of the end plates 23, the structure is thoroughly coated with weatherproof material. This material may take the form of lacquer, varnish, paint of any suitable character, and, if desired, a pigment may be added for color appearance. The coating may be applied in any suitable manner, though I have found that by immersing the unit, as a whole, in a vat of sealing and coating material, extremely effective results are accomplished. As a result of the spacing of the plates 10 from the tube 21, the sealing and coating material may flow into the space between the parts effectually sealing the joint, and thoroughly coating the inner edges of the plates. Also, the sealing material has a tendency to build up at the joints to provide a thickened seal at this point. Furthermore, all exposed portions of the washers are thoroughly coated, and especially at their points of contact with the plates, so that the juncture between the washers and the plates is thoroughly sealed.

In Figs. 8 and 9 I have shown a modified form of washer. The washer 34, corresponding to the washer illustrated in Figs. 1 and 4 is more deeply corrugated to provide greater resiliency thereof, and as a result of the enlarged opening in the washer, there is ample opportunity for the sealing material to cover all exposed parts.

By thoroughly coating the entire unit, as above described, in addition to sealing the edges of the parts of the above described, the entire unit is covered with a weatherproofing coating, which, when pigmented, not only provides for resistance against moisture and the like, but also adds materially to the appearance of the structure.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a rectifier stack of the selenium and like type, comprising at least a rectifying plate of the character recited, a radially corrugated metallic and resilient washer disposed at opposite sides thereof, terminal means for the stack, a lockwasher at each end of the stack, said plate and washers having apertures therein, and an insulation member seated in the apertures and supporting the apertured elements in clamped and contacting condition thereon by said lock washers.

2. A stack as defined by claim 1 wherein there is provided a plurality of rectifying plates and a number of radially corrugated washers.

3. In a rectifier stack of the selenium and like type, comprising a plurality of substantially identical, centrally apertured, rectifying plates, a resilient, readily compressible, metallic plate spacing and ventilating radially corrugated washer means disposed between each adjacent pair of plates, an insulation member seated in the plate apertures and localizing said washer means, and means on said member retaining said plates and washer means under compressive force upon said member.

4. In a rectifier stack of selenium and like type, comprising a plurality of rectifying plates, spacing washer means disposed between each adjacent pair of plates, an insulation member upon which said plates and washer means are mounted in clamped relation, an insulation washer at each end of the stack and mounted upon said member, each insulation washer in offset relation to said member having a slot therein, and a stop member having a yielding tongue portion detachably engaging in at least one of the slots.

5. A rectifier stack as defined by claim 4 wherein said spacing washer means between each pair of plates comprises a resilient, readily compressible, metallic spacing and self-ventilating member.

6. A rectifier stack as defined by claim 4 wherein said spacing washer means between each pair of plates comprises a resilient, metallic annular type washer having radially disposed corrugations upon opposite sides.

7. In a rectifier stack of the selenium and like type, the combination of a plurality of rectifying plates of the character described, each centrally apertured, insulation core means disposed therein for plate alignment, support and retention, and metallic, centrally apertured radially corrugated washer means between each adjacent pair of plates and disposed upon said core means, the radial corrugations of the washer means producing upon opposite sides spaced radially disposed grooves having their opposite ends terminating at the inner and outer edges respectively of the washer means.

8. A rectifier as defined by claim 7 wherein said corrugations providing alternated radially disposed contacting portions and grooves upon one side of the washer means is alternated relative to the radially disposed contacting portions and grooves upon the other side of the washer means.

9. In a rectifier stack of the selenium and like type comprising at least a centrally apertured rectifying plate of the character recited, center cooling conductive washer means disposed at opposite sides of said plate, insulation core means disposed in the plate aperture and extending through the washer means, means retaining the plate and washer means on the core means in assembled and operative condition, an insulation washer like means on the end of the core means, and a stop member selectively carried by the insulation washer like means to project outwardly therefrom for rectifier location determination.

10. A rectifier as defined by claim 9 wherein the insulation washer-like means has a polygonal outline and the stop member has a stop portion disposable relative to the sides of said insulation washer means.

11. In a rectifier stack of the selenium like type comprising at least a rectifying plate of the character recited, a metallic washer disposed at opposite sides thereof and having radially disposed slots on its opposite face, terminal means for the stack, a lock-washer at each end of the stack, said plate and washers having apertures therein, an insulating member seated in the apertures and supporting the apertured elements in clamped and contacting condition therein by said lock-washers, the apertures in said plates being of greater diameter than the diameter of said insulating member, and a sealing medium interposed between the walls of said aperture and said insulating member.

12. In a rectifier stack of the selenium like type comprising at least a rectifying plate of the character recited, a metallic washer disposed on opposite sides thereof having radially disposed grooves in its opposite side faces, terminal means for the stack, a lock-washer at each end of the stack, said plate and washers having apertures therein, and an insulating member seated in the apertures and supporting the apertured elements in a clamped and contacting condition thereon by said lock-washers, the apertures in said plate and washers being of greater diameter than the insulating member, and a sealing compound sealing the juncture between said plate and insulating support member and covering said washers.

13. In a rectifier stack of the selenium like type comprising at least a rectifying plate of the character recited, a radially corrugated metallic and resilient washer disposed at opposite sides thereof, terminal means for the stack, a lock-washer at each end of the stack, said plate and washers having apertures therein, an insulating member seated in the apertures and supporting the apertured elements in clamped and contacting condition thereon by said lock-washers, and a sealing and weatherproof coating covering said plates and said corrugated resilient washers, and sealing the juncture between said plates and the insulating support and the juncture between said washers and the faces of the plates.

SARKES TARZIAN.

REFERENCES CITED

The following references are of record in the file of this patent:

UNITED STATES PATENTS

| Number | Name | Date |
|---|---|---|
| 2,338,890 | Zierdt | Jan. 11, 1944 |

FOREIGN PATENTS

| Number | Country | Date |
|---|---|---|
| 318,265 | Great Britain | Dec. 1, 1930 |
| 547,122 | Germany | Mar. 19, 1932 |